United States Patent
Shimakawa

(10) Patent No.: US 9,340,655 B2
(45) Date of Patent: May 17, 2016

(54) COMPOSITION FOR SILICONE RUBBER FOAM, MANUFACTURING METHOD OF SILICONE RUBBER FOAM, AND SILICONE RUBBER FOAM

(71) Applicant: MOMENTIVE PERFORMANCE MATERIALS JAPAN LLC, Tokyo (JP)

(72) Inventor: Masanari Shimakawa, Tokyo (JP)

(73) Assignee: MOMENTIVE PERFORMANCE MATERIALS JAPAN LLC, Tokyo (JP)

( * ) Notice: Subject to any disclaimer, the term of this patent is extended or adjusted under 35 U.S.C. 154(b) by 0 days.

(21) Appl. No.: 14/730,776

(22) Filed: Jun. 4, 2015

(65) Prior Publication Data
US 2015/0267021 A1    Sep. 24, 2015

Related U.S. Application Data

(60) Division of application No. 14/297,901, filed on Jun. 6, 2014, now Pat. No. 9,074,097, which is a division of application No. 14/036,793, filed on Sep. 25, 2013, now Pat. No. 8,865,784, which is a continuation of application No. PCT/JP2012/007402, filed on Nov. 19, 2012.

(30) Foreign Application Priority Data

Dec. 9, 2011   (JP) ................... 2011-269565

(51) Int. Cl.
| | | |
|---|---|---|
| C08J 9/00 | (2006.01) | |
| C08J 9/14 | (2006.01) | |
| C08J 9/06 | (2006.01) | |
| C08K 3/36 | (2006.01) | |
| C08K 5/00 | (2006.01) | |
| C08K 5/14 | (2006.01) | |
| C08K 5/56 | (2006.01) | |
| C08J 3/24 | (2006.01) | |
| C08L 83/04 | (2006.01) | |
| C08G 77/12 | (2006.01) | |
| C08G 77/20 | (2006.01) | |

(52) U.S. Cl.
CPC .......... *C08J 9/0061* (2013.01); *C08J 3/246* (2013.01); *C08J 3/247* (2013.01); *C08J 9/0052* (2013.01); *C08J 9/0066* (2013.01); *C08J 9/06* (2013.01); *C08K 3/36* (2013.01); *C08K 5/00* (2013.01); *C08K 5/14* (2013.01); *C08K 5/56* (2013.01); *C08L 83/04* (2013.01); *C08G 77/12* (2013.01); *C08G 77/20* (2013.01); *C08J 2201/026* (2013.01); *C08J 2203/00* (2013.01); *C08J 2383/05* (2013.01); *C08J 2383/07* (2013.01); *C08J 2483/05* (2013.01)

(58) Field of Classification Search
None
See application file for complete search history.

(56) References Cited

U.S. PATENT DOCUMENTS

| | | | |
|---|---|---|---|
| 5,135,960 | A | 8/1992 | Higuchi et al. |
| 5,214,074 | A | 5/1993 | Takahashi et al. |
| 6,387,971 | B1 | 5/2002 | Yaginuma |
| 8,088,878 | B2 | 1/2012 | Koellnberger |
| 2005/0113472 | A1 | 5/2005 | Fillmore et al. |
| 2010/0292361 | A1 | 11/2010 | Koellnberger |
| 2011/0003906 | A1 | 1/2011 | Angermaier et al. |

FOREIGN PATENT DOCUMENTS

| | | |
|---|---|---|
| JP | 47-043294 A | 1/1972 |
| JP | 52-081378 A | 7/1977 |
| JP | 07-247436 A | 9/1995 |
| JP | 09-040870 A | 2/1997 |
| JP | 09-124816 A | 5/1997 |
| JP | 2003-213132 A | 7/2003 |
| JP | 2005-133060 A | 5/2005 |
| JP | 2006-176550 A | 7/2006 |
| JP | 2008-150447 A | 7/2008 |
| JP | 2010-047646 A | 3/2010 |
| JP | 2011-511766 A | 4/2011 |

OTHER PUBLICATIONS

M. Shimakawa, U.S. PTO Notice of Allowance, U.S. Appl. No. 14/036,793, dated Jun. 20, 2014, 9 pages.
Translation of International Preliminary Report on Patentability for PCT/JP2012/007402, dated Jun. 10, 2014, 6 pages.
M. Shimakawa, U.S. PTO Official Action, U.S. Appl. No. 14/297,901, dated Nov. 19, 2014, 14 pages.
M. Shimakawa, U.S. PTO Notice of Allowance, U.S. Appl. No. 14/297,901, dated Mar. 6, 2015, 12 pages.

*Primary Examiner* — Kara Boyle
(74) *Attorney, Agent, or Firm* — Foley & Lardner LLP

(57) ABSTRACT

There are provided a composition for silicone rubber foam, a manufacturing method of a silicone rubber foam, and a silicone rubber foam in which it is possible to control the foaming states. The composition for silicone rubber foam contains: (A) 100 parts by mass of polyorganosiloxane having a degree of polymerization of 4,000 to 10,000 and having two or more alkenyl groups at a content of 0.001 mmol/g or more and less than 0.3 mmol/g; an amount of polyorganohydrogensiloxane having an average of two or more Si-atom-bonded hydrogen atoms so that a molar ratio of the hydrogen atoms to the alkenyl groups in the (A) component is 0.001 to 5; 0.1 to 10 parts by mass of an organic foaming agent with a decomposition temperature of 50 to 250° C.; 5 to 200 parts by mass of silica powder; and a catalyst amount of a platinum-based metal catalyst activated with ultraviolet rays.

12 Claims, 1 Drawing Sheet

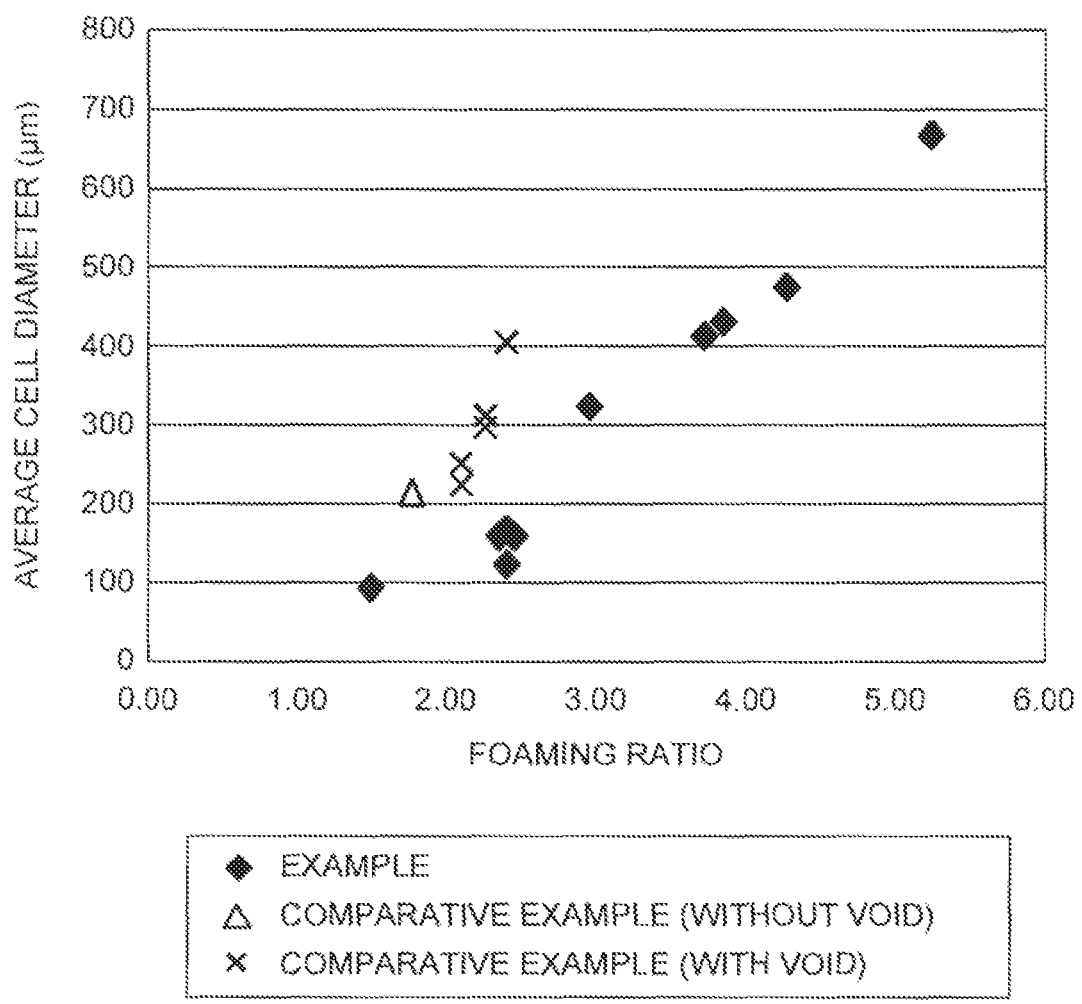

COMPOSITION FOR SILICONE RUBBER FOAM, MANUFACTURING METHOD OF SILICONE RUBBER FOAM, AND SILICONE RUBBER FOAM

CROSS-REFERENCE TO RELATED APPLICATIONS

This application is a divisional of U.S. application Ser. No. 14/297,901 filed on Jun. 6, 2014 which is a divisional of U.S. application Ser. No. 14/036,793 filed on Sep. 25, 2013 which is a continuation of prior International Application No. PCT/JP2012/007402 filed on Nov. 19, 2012, which is based upon and claims the benefit of priority from Japanese Patent Application No. 2011-269565 filed on Dec. 9, 2011; the entire contents of all of which are incorporated herein by reference.

FIELD

The present invention relates to a composition for silicone rubber foam, a manufacturing method of a silicone rubber foam, and a silicone rubber foam.

BACKGROUND

The silicone rubber foam is well known as a material excellent in weather resistance, electric property, compression set and so on. The silicone rubber foam can be basically obtained by compounding an organic foaming agent such as azobisisobutyronitrile (AIBN), azodicarbonamide (ADCA), dinitrosopentamethylenetetramine (DPT) or the like and a curing agent into a thermosetting millable silicone rubber composition, and then foaming and curing the resultant by heating. In order to obtain a silicone rubber foam having excellent characteristics, it is necessary to balance the foaming rate (decomposition rate) of the organic foaming agent and the curing rate of the silicone rubber composition.

More specifically, if the decomposition rate of the organic foaming agent is lower than the curing rate of the silicone rubber composition, cells become fine but the foaming ratio becomes low, whereas if the curing rate of the silicone rubber composition is lower than the decomposition rate of the organic foaming agent, gas generated by decomposition of the organic foaming agent cannot be sufficiently captured, resulting in a low foaming ratio and an uneven cell structure.

In addition, since the organic foaming agent has a high decomposition rate and rapidly generates gas, it is necessary to timely bring the silicone rubber composition into a predetermined cross-linked state when the organic foaming agent decomposes, in order to capture the generated gas.

In the cross-linking by peroxide, the cross-linking rate can be adjusted to a certain degree by selection of an organic peroxide and a compounding amount, but it is difficult to strictly adjust the cross-linking density at a timing of decomposition of the organic foaming agent, thus bringing about a disadvantage that it is required to compound an excessive amount of organic foaming agent or to strictly manage process conditions.

An addition-type thermosetting silicone rubber using a platinum catalyst (see Patent Reference 1 (JP-B 1972-043294 (KOKOKU))) or this silicone rubber in combination with the above-described cross-linking by peroxide (see Patent Reference 2 (JP-A 1977-081378 (KOKAI))) has a disadvantage that the rubber is inferior in preservation stability when the cross-linking density at decomposition of the foaming agent is optimized at a usual production rate and is inferior in productivity when priority is given to the preservation stability because a long time is required to bring the rubber into a predetermined cross-linked state, though the adjustment of the cross-linking density at the timing of decomposition of the foaming agent is relatively easy.

Patent Reference 3 (JP-A 2010-047646 (KOKAI)) and Patent Reference 4 (JP-A 2003-213132 (KOKAI)) disclose ultraviolet irradiation curable silicone compositions using a platinum complex activated with ultraviolet rays. However, the cured products obtained from the compositions disclosed therein are rubber or gel.

SUMMARY

An object of the present invention is to provide a composition tor silicone rubber foam in which it is possible to arbitrarily control the cross-linked state of the silicone rubber during foaming to thereby control the foaming states such as the ceil diameter, the foaming ratio and so on.

Another object of the present invention is to provide a manufacturing method of a silicone rubber foam in which it is possible to arbitrarily control the cross-linked state of the silicone rubber during foaming to thereby control the foaming states such as the cell diameter, the foaming ratio and so on, and to provide a silicone rubber foam obtained by the method.

A composition for silicone rubber foam of the present invention contains:

(A) 100 parts by mass of alkenyl group-containing polyorganosiloxane expressed by a following general formula (A1), having a mass average degree of polymerization of 4,000 to 10,000 and having two or more R2s in the following general formula (A1) as a content per mass in a molecule at a rate of 0.001 mmol/g or more and less than 0.3 mmol/g:

[Chemical Formula 1]

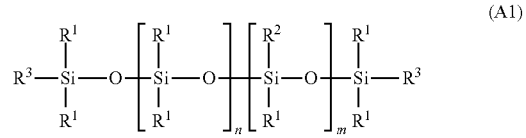

(A1)

(where, $R^1$ represents an unsubstituted or substituted monovalent hydrocarbon group containing no aliphatic unsaturated group, $R^2$ represents an alkenyl group, and $R^3$ represents a monovalent group indicating each independent $R^1$ or $R^2$. In the formula (A1), n and m represent the total numbers of each recurring unit obtained by random polymerization or block polymerization, and n+m+2 obtained by adding 2 that is the number of terminal groups to n and m represents a mass average degree of polymerization);

(B) an amount of polyorganohydrogensiloxane having an average of two or more hydrogen atoms bonded to a silicon atom in a molecule so that a molar ratio of the silicon-atom-bonded hydrogen atoms to the alkenyl groups in the (A) component (the number of moles of hydrogen atoms bonded to the silicon atoms in the (B) component/the number of moles of the alkenyl groups in the (A) component) is 0.001 to 5;

(C) 0.1 to 10 parts by mass of an organic foaming agent with a decomposition temperature of 50 to 250° C.;

(D) 5 to 200 parts by mass of silica powder; and (E) a catalyst amount of a platinum-based metal compound catalyst activated with ultraviolet rays.

A manufacturing method of a silicone rubber foam of the present invention, includes: a step (1) of irradiating the aforementioned composition for silicone rubber foam of the present invention with ultraviolet rays at a temperature lower than the decomposition temperature of the (C) organic foaming agent to obtain a cross-linked body; and a step (2) of heat-treating the cross-linked body at a temperature equal to or higher than the decomposition temperature of the (C) organic foaming agent to obtain a silicone rubber foam. Further the present invention provides a silicone rubber foam obtained by the above-described manufacturing method of the present invention.

According to the present invention, a composition for silicone rubber foam can be provided in which it is possible to arbitrarily control the cross-linked state of the silicone rubber during foaming to thereby control the foaming states such as the cell diameter, the foaming ratio and so on.

According to the manufacturing method of the present invention, it is possible to arbitrarily control the cross-linked state of the silicone rubber during foaming to thereby control the foaming states such as the cell diameter, the foaming ratio and so on of the silicone rubber foam to be obtained.

BRIEF DESCRIPTION OF THE DRAWINGS

FIG. 1 is a graph indicating the relations between average cell diameters and foaming ratios of silicone rubber foams obtained in examples.

DETAILED DESCRIPTION

Hereinafter, an embodiment of the present invention will be described.

[Composition for Silicone Rubber Foam]

A composition for silicone rubber foam of the present invention contains: (A) 100 parts by mass of alkenyl group-containing polyorganosiloxane expressed by the above-described general formula (A1), having a mass average degree of polymerization of 4,000 to 10,000 and having two or more $R^2$s in the general formula (A1) as a content per mass in a molecule at a rate of 0.001 mmol/g or more and less than 0.3 mmol/g; (B) an amount of polyorganohydrogensiloxane having an average of two or more hydrogen atoms bonded to a silicon atom in a molecule so that a molar ratio of the silicon-atom-bonded hydrogen atoms to the alkenyl groups in the (A) component (the number of moles of hydrogen atoms bonded to the silicon atoms in the (B) component/the number of moles of the alkenyl groups in the (A) component) is 0.001 to 5; (C) 0.1 to 10 parts by mass of an organic foaming agent with a decomposition temperature of 50 to 250° C.; (D) 5 to 200 parts by mass of silica powder; and (E) a catalyst amount of a platinum-based metal compound catalyst activated with ultraviolet rays.

In the composition for silicone rubber foam of the present invention, the (A) component and the (B) component cross-link by addition reaction to form a cross-linked body of polyorganosiloxane. The (E) component acting as a catalyst is a catalyst activated with ultraviolet rays to provide excellent preservation stability. Further, the organic foaming agent being the (C) component acting by heat and the (E) component acting with ultraviolet rays are used in combination to enable the cross-linking and the foaming to be controlled by separate operations, so that the control of the cell diameter and the foaming ratio of the silicone rubber foam is easy.

Note that in this specification the "cross-linked body" obtained from the composition for silicone rubber foam of the present invention refers to a cross-linked body of polyorganosiloxane obtained by cross-linking of the (A) component and the (B) component by addition reaction. Further, the silicone rubber refers to the cross-linked body of polyorganosiloxane in this specification.

Hereinafter, each component will be described.

((A) Component)

Alkenyl group-containing polyorganosiloxane of (A) is a base polymer of the composition of the present invention. The (A) component is a substantially linear siloxane macromolecule expressed by the following general formula (A1):

[Chemical Formula 2]

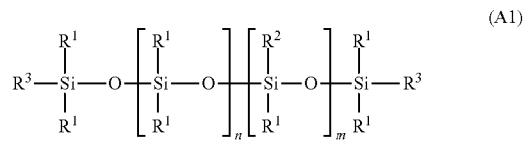

In the formula (A1), $R^1$ represents an unsubstituted or substituted monovalent hydrocarbon group containing no aliphatic unsaturated group, $R^2$ represents an alkenyl group, and $R^3$ represents a monovalent group indicating each independent $R^1$ or $R^2$. In the formula (A1), n and m represent the total numbers of each recurring unit obtained by random polymerization or block polymerization, and n+m+2 obtained by adding 2 that is the number of terminal groups to n and m represents a mass average degree of polymerization. Hereinafter, polyorganosiloxane expressed by the general formula (A1) is sometimes referred to as polyorganosiloxane (A1).

Note that the above general formula (A1) does not always mean a block copolymer. More specifically, m representing the number of —$R^1R^2SiO$— as intermediate units and n representing the number of —$R^1{}_2SiO$— as intermediate units do not represent the numbers in a block but represent the total numbers of the intermediate units existing in the whole molecule respectively. In other words, polyorganosiloxane expressed by the general formula (A1) may be a random copolymer. A siloxane skeletal structure may include a few branches but is preferably linear because of ability of synthesizing polymer with high degree of polymerization indicated below with good controllability.

The mass average degree of polymerization of polyorganosiloxane (A1), that is, the number of siloxane units is expressed by n°m+2 obtained by adding 2 that is the number of terminal groups to n and m in the general, formula (A1) and ranges from 4,000 to 10,000. The mass average degree of polymerization preferably ranges from 5,000 to 7,000. If the mass average degree of polymerization of polyorganosiloxane (A1) is less than 4,000, required operability cannot be obtained and sufficient mechanical strength cannot be obtained. On the other hand, if the mass average degree of polymerization of polyorganosiloxane (A1) exceeds 10,000, polymerization becomes difficult.

n and m are selected so that the requirement of the above-described mass average degree of polymerization is satisfied and the content of $R^2$s (including $R^2$s in the terminal units represented as $R^3$) per mass in a molecule becomes 0.001 mmol/g or more and less than 0.3 mmol/g. The content of $R^2$s preferably ranges from 0.005 to 0.1 mmol/g, and more preferably 0.01 to 0.05 mmol/g. If the content of $R^2$s is less than 0.001 mmol/g, the strength of the cross-linked body is insufficient to fail to obtain a silicone rubber foam, and if the content of $R^2$s is 0.3 mmol/g or more, the cross-linked body becomes fragile so that the strength of obtained a silicone rubber foam decreases. Further, at least two $R^2$s exist in one molecule because $R^2$s perform addition reaction to form the cross-linked body.

$R^1$ is an unsubstituted or substituted monovalent hydrocarbon group containing no aliphatic unsaturated group. Examples of $R^1$ include unsubstituted hydrocarbon groups such as alkyl groups including a methyl group, an ethyl group, a propyl group, a butyl group, a pentyl group, a hexyl group and so on; aryl groups including a phenyl group, a tolyl group, a xylyl group and so on; aralkyl groups including a benzyl group, a phenethyl group and so on, and substituted hydrocarbon groups such as a chloromethyl group, a 3-chloropropyl group, a 3,3,3-trifluoropropyl group, a 3 cyanopropyl group, a 3-methoxypropyl group and so on. For easiness of synthesis and handling of polyorganosiloxane (A1) and excellent heat resistance, preferably 50% or more of $R^1$s are methyl groups, and particularly preferably all of $R^1$s are methyl groups. It is possible to arbitrarily use a phenyl group especially when beat resistance, cold resistance, or radiation resistance is required, and to use a 3,3,3-trifluoropropyl group when oil resistance and/or solvent resistance are/is required.

$R^2$ is an alkenyl group. Concrete examples of $R^2$ include a vinyl group, an allyl group, a 3-butenyl group, a 4-pentenyl group, a 5-hexenyl group and so on. For easiness of synthesis and handling of polyorganosiloxane (A1) and easy addition reaction, $R^2$ is preferably a vinyl group. $R^2$s may be bonded to any silicon atoms in a molecule, but a part of $R^2$s are preferably bonded to silicon atoms at molecular terminals because they exhibit excellent reactivity. As the (A) component, one kind may foe used or two or more kinds may be used in combination.

((B) Component)

The (B) component is polyorganohydrogensiloxane having a siloxane skeletal structure in which a hydrogen, atom and an organic group are bonded, to a silicon atom and having an average of two or more hydrogen atoms in a molecule. When manufacturing a silicone rubber foam using the composition of the present invention, the (B) component forms a cross-linked body by reaction with the alkenyl group in the (A) component by the catalysis of the (E) component. An exemplified example of the organic group bonded to the silicon atom in the (B) component is an unsubstituted or substituted monovalent hydrocarbon group in the same range with $R^1$ in the (A) component, and a methyl group is preferable because of easiness of synthesis and handling. The siloxane skeletal structure of the (B) component may be any of linear-chain, branched, or cyclic.

The amount of hydrogen atoms bonded to silicon atoms in the (B) component as the content per mass is preferably 0.1 mmol/g or more and 20 mmol/g or less. The hydrogen atoms may be bonded to any silicon atoms, but at least a part of them are preferably bonded to silicon, atoms at molecular terminals because they exhibit excellent reactivity. The mass average degree of polymerization of the (B) component is preferably 4 to 500, and more preferably 10 to 100 because the (B) component can come into contact with the (A) component while maintaining its liquid form at a reaction temperature of addition reaction. As the (B) component, one kind may he used or two or more kinds may be used in combination.

The content of the (B) component in the composition for silicone rubber foam of the present invention is a sufficient amount for cross-linking the (A) component. The content of the (B) component is such an amount that the molar ratio of the hydrogen atoms bonded to the silicon atoms in the (B) component to $R^2$s (alkenyl groups) in the (A) component (the number of moles of hydrogen atoms bonded to silicon atoms in the (B) component/the number of moles of alkenyl groups in the (A) component) is 0.001 to 5 because the (B) content can impart, to a silicone rubber foam to be obtained, a sufficient effect of cross-linking, more specifically, elasticity enough to form foam and from the viewpoint that the (B) component imparts, to a cross-linked body, a cross-linking density exhibiting flexibility to facilitate foam format ion by the action of the organic foaming agent being the (C) component. Further, the above molar ratio is preferably 0.01 to 3 in the composition of the present invention.

((C) Component)

The organic foaming agent being the (C) component is an organic foaming agent, with a decomposition temperature of 50 to 250° C. The (C) component is compounded in the composition of the present invention and decomposes by being heated in a cross-linked body obtained by cross-linking the (A) component and the (B) component to generate gas to thereby make the cross-linked body into foam. If the decomposition tempera cure of the organic foaming agent is lower than 50° C., the organic foaming agent is inferior in handling and preservation stability, and if exceeding 250° C., the organic foaming agent is inferior in productivity.

As the organic foaming agent, any organic foaming agent may be used without any limitation as long as it is an organic foaming agent with a decomposition temperature of 50 to 250° C. conventionally used in manufacture of a silicone rubber foam. Concrete examples of the organic foaming agent include: azo-based compounds such as azobisisobutyronitrile (decomposition temperature: 102° C.), 1,1'-azobis(1-acetoxy-1-phenylethane) (decomposition temperature: 106° C.), and azodicarbonamide (decomposition temperature: 205° C.); and nitroso compounds such as dinitrosopentamethylenetetramine (decomposition temperatures 203° C.), and N,N-dimethyl-N,N-dinitrosoterephthalamide (decomposition temperature: 105° C.). The compounds decompose when heated at temperatures equal to or higher than the decomposition temperatures to generate $N_2$ or $CO_2$ gas. Further, it is possible to adjust foaming temperatures by using an adjuster such as urea or organic acid in combination with the organic foaming agents.

Among them, organic foaming agents with decomposition temperatures of 80 to 200° C. from the viewpoint of productivity and easiness of handling are preferably used. Note that as the (C) component, one kind may be used or two or more kinds may be used in combination.

A compounding amount of the organic foaming agent being the component (C) in the composition of the present invention is 0.1 to 10 parts by mass per 100 parts by mass of the (A) component, and preferably 1 to 7 parts by mass. If the compounding amount of the (C) component is less than 0.1 parts by mass, a sufficient amount of gas cannot be generated by the decomposition to fail to obtain foam. On the other hand, if the compounding amount of the (C) component exceeds 10 parts by mass, the foam to be obtained is likely to deform to deteriorate in quality.

((D) Component)

A silica powder being the (D) component may be a publicly-known one that is generally compounded in a silicone rubber. The (D) component has a function of imparting appropriate fluidity to the composition before cross-linking and imparting, to the cross-linked body of polyorganosiloxane obtained by cross-linking, a high mechanical strength required according to the usage thereof.

The silica powder being the (D) component preferably has a specific surface area measured by the BET method (hereinafter, referred to as a BET specific surface area) of 50 $m^2$/g or more, more preferably 50 to 600 $m^2$/g, and much more preferably 100 to 400 $m^2$/g to serve the above-described function by being added to the composition of the present invention. The kind of silica, is not particularly limited, but precipitated silica, aerosol silica (fumed silica), pyrogenic silica or the like is preferably used. In terms of reinforcing property, aerosol silica, is preferable.

The silica powder being the (D) component is absolutely essential as a reinforcing filler of rubber but is likely to cause problems such as thickening, remarkable plasticization return and so on if the silica powder is added as it is because many silanol groups (Si—OH groups) exist on the untreated silica surface. Therefore, it is preferable to subject the surface of the silica powder to hydrophobic treatment. The surface treatment amount is preferably set to obtain a carbon amount on the silica surface of 2.0 mass % or wore, and more preferably 3.0 mass % or more. At the carbon amount of less than 2.0 mass %, the silica powder provides less effect in suppression of the thickening of the composition and improvement in pot life. Note that the upper limit of the carbon amount is not particularly limited, but is generally 20 mass % or less, preferably 12 mass % or less, and particularly preferably 8 mass % or less. As the silica powder being the (D) component, the one which has been previously subjected to the surface treatment in a powder state may be used, or the silica powder may be subjected to the surface treatment in a kneading process.

As the surface treatment method of the silica powder, a generally known surface treatment technique can be employed. As examples of an organosilicon compound used as a surface treatment agent include organosilazanes including hexaorganodisilazane such as 1,3-divinyltetramethyldisilazane, 1,3-dimethyltetravinyldisilazane, and hexamethyldisilazane; and octaorganotrisilazane such as octamethyltrisilazane, and 1,5-divinylhexamethyltrisilazane, silane coupling agents including alkyltrialkoxysilane such as methyltrimethoxysilane, ethyltrimethoxysilane, propyltrimethoxysilane, and butyltrimethoxysilane; dialkyldialkoxysilane such as dimethyldimethoxysilane, diethyldimethoxysilane, dimethyldiethoxysilane, and diethyldiethoxysilane; alkenyltrialkoxysilane such as vinyltriethoxysilane, vinyltrimethoxysilane and vinyltris(methoxyethoxy)silane; dialkenyldialkoxysilane such as divinyldimethoxysilane and divinyldiethoxysilane; trialkylalkoxysilane such as trimethylmethoxysilane and triethylmethoxysilane; trialkenylalkoxysilane such as trivinylmethoxysilane and trivinylethoxysilane; organochlorosilane such as trimethylchlorosilane, dimethyldichiorosilane, methyltrichlorosilane, vinyltrichlorosilane, divinyldichiorosilane, and trivinylchlorosilane; chloropropyltrimethoxysilane, dimethylpolysiloxane (including a cyclic structure), organohydrogenpolysiloxane and the like, and may be a partial hydrolysis condensate thereof. Note that among them, a silane-based coupling agent having methyl groups as substituents bonded to the silicon atoms other than the hydrolyzable groups, cyclic dimethylpolysiloxane, and organosilazanes are preferable.

As the silica powder being the (D) component, a commercially-available product may be used. As examples of the commercially-available product include Aerosil 200 (trade name, manufactured by EVONIC, BET specific surface area: 200 $m^2/g$), Aerosil 300 (tradename, manufactured by EVONIC, BET specific surface area: 300 $m^2/g$) and the like as the aerosol silica with the surface untreated. Further, in the present invention, it is preferable to use the silica powder made by subjecting the commercially-available product to the surface treatment with oxtamethylcyclotetrasiloxane, hexamethyldisilazane or the like. As the (D) component, one kind may be used or two or more kinds may be used in combination.

A compounding amount of the (D) component in the composition of the present invention is 5 to 200 parts by mass per 100 parts by mass of the (A) component, and preferably 10 to 100 parts by mass. If the compounding amount of the silica powder being the (D) component exceeds 200 parts by mass, the viscosity of the composition significantly increases to degrade the workability in molding, whereas if the compounding amount is less than 5 parts by mass, the characteristics of the mechanical strength and so on of the silicone rubber foam to be obtained are not sufficient.

((E) Component)

A platinum-based metal compound catalyst activated with ultraviolet rays being the (E) component catalyzes the addition reaction between the (A) component and the (B) component. The (E) component is a curing catalyst that is activated with ultraviolet irradiation and has ultraviolet activity of accelerating the addition reaction between the alkenyl groups in the (A) component and the hydrosilyl groups in the (B) component.

As the (E) component used in the present invention, any platinum-based metal compound, may be need without any limitation as long as it acts as a catalyst with ultraviolet irradiation. Note that the platinum-based metal means platinum, rhodium, palladium a rid the like. The (E) component is an ultraviolet-active catalyst designed as a compound containing a platinum-based metal such that the catalyst activity appears by being irradiated with ultraviolet rays. As the (E) component, concretely, a cyclopentadienyl platinum compound is preferable, and (methylcyclopentadienyl) trimethylplatinum is particularly preferable. As the (E) component, one kind may be used or two or more kinds may be used in combination.

A compounding amount of the (E) component in the composition of the present invention is an amount to catalyze the addition reaction between the (A) component and the (B) component. Concretely, the compounding amount of the (E) component is generally 0.1 to 1000 ppm, and preferably 0.1 to 100 ppm in terms of platinum metal atoms to the total amount of the (A) component and the (B) component. The compounding amount of the (E) component in this range sufficiently catalyzes the addition reaction between the (A) component and the (B) component to obtain an excellent addition reaction rate. To obtain excellent heat resistance in the silicone rubber foam to be obtained, the compounding amount of the (E) component is more preferably 0.5 to 50 ppm, and particularly preferably 1 to 8 ppm in terms of platinum metal atom.

(Optional Components)

The composition for silicone rubber foam of the present invention preferably further contains, as the (F) component, an organic peroxide with a decomposition temperature equal to or higher than the decomposition, temperature of the (C) component. By compounding the organic peroxide being the (F) component, the cross-linking further proceeds in the cross-linked body of polyorganosiloxane in operation of foaming performed at a temperature equal to or higher than the decomposition temperature of the (C) component to form a silicone rubber foam with excellent strength and high foaming ratio.

The organic peroxide being the (F) component is not particularly limited as long as it has a decomposition temperature equal to or higher than the decomposition temperature of the (C) component and is generally used in this kind of composition for silicone rubber foam. Concrete examples of the organic peroxide include benzoyl peroxide, 2,4-dichlorobenzoyl peroxide, p-chlorobenzoyl peroxide, dicumyl peroxide, 2, 5-bis (t-butyl peroxy)-2,5-dimethylhexane, 2,5-bis(t-butyl peroxy)-2,5-dimethylhexyne, di-t-butyl peroxide, t-butyl peroxy benzoate, bis(4-t-butylcyclohexyl) peroxydicarbonate and so on.

The organic peroxides are arbitrarily selected depending on the decomposition temperature of the organic foaming agent being the (C) component to be used. The decomposition temperature of the organic peroxide is equal to or higher than the decomposition temperature of the organic foaming agent being the (C) component to be combined, and preferably higher by 10 to 60° C. than the decomposition temperature of the (CI component from the viewpoint of productivity. As the (F) component, one kind may be used or two or more kinds may be used in combination.

A compounding amount of the organic peroxide being (F) component in the composition of the present invention is preferably 0.001 to 10 parts by mass per 100 parts by mass of the (A) component, and more preferably 0.1 to 5 parts by mass. If the compounding amount of the (F) component is less than 0.001 parts by mass, the addition effect of the organic peroxide cannot be sufficiently obtained, whereas if the compounding amount exceeds 10 parts by mass, the characteristics such as heat resistance may be degraded in the silicone rubber foam to be obtained.

The composition for silicone rubber foam of the present invention may contain a processing aid that is preferably added when compounding the silica powder being the (D) component. As the processing aid, low-viscosity silicone oil, silicone resin, or silane compound having silanol groups or alkoxy groups at terminals is generally used. In the composition for silicone rubber foam of the present invention, it is preferable to use polydimethylsiloxane having silanol groups at both terminals with a mass average degree of polymerization of about 4 to 200 as the processing aid.

A compounding amount of the processing aid in the composition of the present invention depends on the kind of the (D) component and the compounding amount of the (D) component used with respect to the (A) component. The compounding amount of the processing aid is preferably 0.1 to 20 parts by mass per 100 parts by mass of the (D) component, and more preferably 1 to 10 parts by mass.

In the composition for silicone rubber foam of the present invention, various additives which have been conventionally used, according to various kinds of purposes may be compounded, in addition to the above components, in a range not to inhibit the effects of the present invention. Examples of the additives include inorganic filler other than the silica powder being the (D) component, such as pulverized silica (quartz fine particle), diatomaceous earth, metal carbonate, clay, talc, mica, titanium oxide and the like, conductive filler such as a carbon black, pigment, thixotropy imparting agent, viscosity adjuster for improving the extrusion workability, ultraviolet ray protective agent, anti-mildew agent, beat resistance improver, flame retardant, antioxidant and the like.

The composition for silicone rubber foam of the present invention can be prepared by uniformly kneading the (A) component to the (E) component, and further the (F) component, the processing aid and other components which are compounded as needed, by using a mixing device such as a universal kneading machine, a kneader or the like.

Further, for example, an organic foaming agent, master batch made by kneading the (C) component and a part of the (A) component involved in foaming, a catalyst master batch made by kneading the (E) component that is the catalyst component tor the addition reaction between the (A) component ant the (B) component and a part of the (A) component, and a base compound made by kneading the remainder of the (A) component, the (B) component, the (D) component, and the optional components not involved in the addition reaction between the (A) component and the (B) component, foaming and the like, such as the processing aid and so on may foe separately prepared and used by being mixed together immediately before use. Note that in the case of using the (F) component, the (F) component is preferably mixed together with the master batches and the base compound when they are mixed together immediately before use.

According to the composition for silicone rubber foam of the present invention, the foaming ratio can foe designed in a wide range while keeping an excellent foaming state in the silicone rubber foam to be obtained by changing the ratio of the (B) component to change the cross-linking density of the silicone rubber while keeping constant the ratio of the organic foaming agent being the (C) component to the (A) component in the above-described ranges. Further, the wide range of foaming ratio can be similarly designed also by changing the ratio of the (C) component while keeping constant the ratio of the (B) component to the (A) component. Furthermore, by adjusting the amount of the (B) component with respect to the (A) component, the degree of cross-linking can be made suitable for the foaming, so that a high foaming ratio can be obtained with a small addition amount of the organic foaming agent being the (C) component.

Manufacture of the silicone rubber foam using the composition for silicone rubber foam of the present invention generally includes an ultraviolet irradiation step of activating the catalyst being the (B) component for the addition react ion between the (A) component and the (B) component, and a heating step of decomposing the organic foaming agent being the (C) component to generate foaming gas. When manufacturing the silicone rubber foam using the composition for silicone rubber foam of the present invention, the ultraviolet irradiation step and the heating step may be performed at the same time, but it is preferable to use the following manufacturing method of the present invention because the foaming ratio and the cell diameter of the silicone rubber foam to be obtained can be sufficiently controlled.

[Manufacturing Method of Silicone Rubber Foam]

The manufacturing method of the silicone rubber foam of the present invention includes a step (1) of irradiating the composition for silicone rubber foam of the present invention with ultraviolet rays at a temperature lower than the decomposition temperature of the (C) organic foaming agent to obtain a cross-linked body, and a step (2) of heat-treating the cross-linked body at a temperature equal to or higher than the decomposition temperature of the (C) organic foaming agent to obtain a silicone rubber foam.

In the manufacturing method of the present invention, the composition for silicone rubber foam is generally molded into a shape to which ultraviolet irradiation in the step (1) is efficiently performed, concretely a sheet-shape, line shape, tube shape or the like before the step (1). The thickness of the composition compact for silicone rubber foam in the sheet shape or the like after molding is preferably about 1 to 10 mm from the viewpoint that a cross-linked body in a uniform cross-linked state can be obtained by the ultraviolet irradiation and cells are thus uniformly formed by the foaming performed thereafter, that is, the uniformity of cells in the foam is secured. Examples of the method of making the composition for silicone rubber foam into a compact in the sheet shape or the like with a uniform thickness include general molding methods of a composition for silicone rubber foam, such as an extrusion molding, a calendar molding and the like.

(Step (1))

In the present invention, in the step (1), to activate the platinum-based metal compound catalyst activated with ultraviolet rays being the (E) component, preferably (methylcyclopentadienyl) trimethylplatinum, contained in the composition for silicone rubber foam, the composition for silicone rubber foam, preferably the above-described composition for silicone rubber foam molded in the sheet shape or the like is irradiated with ultraviolet rays.

The wavelength of the irradiated ultraviolet rays can be generally 200 nm to 400 nm, and preferably 250 nm to 400 nm depending on the kind of the (E) component used. The irradiation energy can be 100 mJ/cm$^2$ to 100,000 mJ/cm$^2$ as an integrated light intensity at 365 nm. Note that an atmospheric temperature in irradiation of the ultraviolet rays is lower than the decomposition temperature of the (C) organic foaming agent.

As a light source used in the present invention only needs to be an apparatus that generates ultraviolet rays, and examples thereof include, for example, an ultra-high pressure mercury lamp, a xenon lamp, a mercury-xenon lamp, a high pressure mercury lamp, a metal halide lamp, an intermediate pressure mercury lamp, a low pressure mercury lamp and so on. To irradiate the above-described composition for silicone rubber foam molded into the sheet shape or the like with the ultraviolet rays uniformly also, in particular, in the thickness direction, a plurality of the light sources may be combined.

In the manufacturing method of the present invention, the platinum-based metal compound catalyst activated with ultraviolet rays being the (E) component is activated to accelerate the addition reaction between the (A) component and the (B) component to obtain a cross-linked body of polyorganosiloxane in the seep (1) as descried above.

(Step (2))

By heat-treating the cross-linked body obtained in the above at a temperature equal to or higher than the decomposition temperature of the organic foaming agent being the (C) component, a silicone rubber foam can be obtained. The temperature of the heat treatment is not particularly limited as long as it is equal to or higher than the decomposition temperature of the organic foaming agent, but is preferably higher by 50 to 150° C. than the decomposition temperature. Incidentally, in the case of using an organic foaming agent with a decomposition temperature of 150 to 250° C., it is preferable to set the upper limit of the heat treatment temperature to 300° C. from the viewpoint of preventing thermal deterioration of the composition. Further, the period of the heat treatment is preferably set to 0.5 to 12 hours. An example of the heat treatment method is a method of heat treatment in an oven or the like.

In the case where the composition, for silicone rubber foam contains the organic peroxide being the (F) component, further cross-linking is carried out by the heat treatment. Accordingly, the temperature of the heat treatment in this case is preferably a temperature equal to or higher than the decomposition temperature of the organic foaming agent being the (C) component and equal to or higher than the decomposition temperature of the organic peroxide being the (F) component. Alternatively, the heat treatment in the step (2) may be performed at a temperature equal to or higher than the decomposition temperature of the organic foaming agent being the (C) component and lower than the decomposition, temperature of the organic peroxide being the (F) component, and the obtained silicone rubber foam may be heat-treated at a temperature equal to or higher than the decomposition temperature of the organic peroxide being the (F) component to accelerate cross-linking.

According to the manufacturing method of the present invention, a silicone rubber foam with a foaming ratio of 1.1 to 6 times can be obtained. Note that the foaming ratio in this specification means a foaming ratio measured by a measurement method of foaming ratio used for a general silicone rubber foam. Here specifically, the foaming ratio is a value obtained by using the density of an unfoamed silicone rubber obtained by cross-linking the composition for silicone rubber foam as a reference and dividing the density of the unfoamed. silicone rubber by the density of the obtained silicone rubber foam. The silicons rubber foam manufacture by the manufacturing method of the present invention using the composition for silicone rubber foam of the present invention is a silicone rubber foam with wide range variation in foaming ratio while keeping an excellent foaming state.

Further, the silicone rubber foam manufactured by the manufacturing method of the present invention using the composition for silicone rubber foam of the present invention is a silicone rubber foam which is able to have cells formed relatively densely with respect to the foaming ratio and can be adjusted in ceil diameter in a wide range including a silicone rubber foam of a fine cell diameter. Specifically, a silicone rubber foam can be obtained in which an average cell diameter obtained by measuring ail of cell cross-sections existing per 1.65 mm$^2$ in an arbitrary cross-section of the silicone rubber foam using a microscopic image is 10 to 700 µm. Note that the average cell diameter in this case indicates the average value of the cell diameters measured in the vertical direction or the horizontal direction of the image about all of the cell cross-sect ions which are entirely captured in the microscopic image indicating an area of 1.65 mm$^2$ of the cross-section of the foam.

EXAMPLES

Examples of the present invention will be described below taut the present invention is not limited to those examples, In examples and comparative examples, following polyorganosiloxane was used as the (A) component, the (B) component and the processing aid (process oil). Note that siloxane unit is represented by the following symbols.

M unit: $(CH_1)_3SiO_{1/2}$—
$M^V$ unit: $(CH_3)_2(CH_2=CH)SiO_{1/2}$—
$M^{OH}$ unit: $(CH_3)_2(OH)SiO_{1/2}$—
D unit: —$(CH_3)_2SiO$—
$D^H$ unit: —$(CH_3)HSiO$—
$D^V$ unit: —$(CH_3)(CH_2=CH)SiO$—

(A) Component

Base polymer 1: linear polydimethylsiloxane with $R^1$s being methyl groups, both of two $R^1$s being $R^2$s, and $R^2$s being vinyl groups in the above general formula (A1). Namely, linear polydimethylsiloxane containing vinyl groups at both terminals in which both terminals are capped with $M^V$ units and intermediate units are composed of D units and $D^V$ units. The mass average degree of polymerization is 7,000 and the content of vinyl groups ($R^2$s) per mass in a molecule is 0.038 mmol/g.

Base polymer 2: linear polydimethylsiloxane with $R^1$s being methyl groups, both of two $R^3$s being $R^2$s, and $R^2$s being vinyl groups in the above general formula (A1). Namely, linear polydimethylsiloxane containing vinyl groups at both terminals in which both terminals are capped with $M^V$ units and intermediate units are composed of d units and $D^V$ units. The mass average degree of polymerization is 4,000 and the content of vinyl groups ($R^2$s) per mass in a molecule is 0.02 mmol/g.

(B) Component

Polymethylhydrogensiloxane: linear polymethylhydrogensiloxane having both terminals capped with M units and having intermediate units composed of D units and $D^H$ units. The mass average degree of polymerization is 40 and the content of silicon-atom-bonded hydrogen atoms per mass in a molecule is 8.8 mmol/g.

Processing Aid (Process Oil)

Linear polydimethylsiloxane containing silanol groups at both terminals; linear polydimethylsiloxane containing silanol groups at both terminals in which both terminals are capped with $M^{OH}$ units and intermediate units are composed of D units, having a mass average degree of polymerization of 50.

Further, in the example and the comparative examples, the following compounds, materials and so on were used as the (C) component to the (F) component.

(C) Component 1,1'-azobis (1-acetoxy-1-phenylethane): Otsuka Chemical Co., Ltd., $OT_{AZO}$-15 (tradename) was used. Decomposition, temperature was 106° C.

(D) Component

D4-treated Aerosil 200: aerosol silica having the surface treated with octamethylcyclotetrasiloxane and a specific surface area of 200 m²/g. The carbon amount on. the silica surface was 3.1 mass %. Aerosil 200 (trade name, manufactured by EVONIC Co., Ltd.) was used as the aerosol silica.

HMDZ-treated Aerosil 200: aerosol silica having the surface treated with hexamethyldisilazane and a specific surface area of 200 m²/g. The carbon amount on the silica surface was 4.1 mass %. Aerosil 200 (trade name, manufactured by EVONIC Co., Ltd. ) was used as the aerosol silica.

(E) Component (Methylcyclopentadienyl) trimethylplatinum: manufactured by Strem Chemicals, Inc. was used.

(F) Component 2,5-bis(t-butyl peroxy)-2,5-dimethylhexane (decomposition temperature of 159° C.).

Examples 1 to 17

(a) Preparation of Composition for Silicone Rubber Foam (a-1) Preparation of Master Batches of (C) Component (Organic Foaming Agent)

The (C) component master batches were prepared each by kneading 1,1'-azobis(1-acetoxy-1-phenylethane) of parts by mass shown in Table 1 and base polymer 1 (examples 1 to 15) or base polymer 2 (examples 16; 17) of the same parts by mass as that of 1,1'-azobis (1-acetoxy- 1-phenylethane) for 1 hour by the kneader and then passing the resultant through 3-roll mill twice.

(a-2) Preparation of Master Batches of (E) Component (Platinum-Based Metal Compound Catalyst Activated with Ultraviolet Rays)

The (E) component master batches were prepared each by kneading (methylcyclapentadienyl) trimethylplatinum of parts by mass shown in Table 1 and base polymer 1 (examples 1 to 15) or base polymer 2 (examples 16, 17) in an amount of 99.87 parts by mass when the (E) component was 0.13 parts by mass for 1 hour by the kneader.

(a-3) Preparation of Base Compounds

In each of the examples 1 to 15, the base compound 1 was manufactured by kneading the remainder of the base polymer 1 used in the above (a-1) and (a-2) into D4-treated Aerosil 200 and processing aid (process oil: linear polydimethylsiloxane containing silanol groups at both terminals) in an amount both shown in Table 1, for 4 hours by the kneader.

In each of the examples 16, 17, the base compound 2 was prepared by kneading the remainder of the base polymer 2 used in the above (a-1) and (a-2) into HMDZ-treated Aerosil 200 in an amount shown in Table 1 for 4 hours by the kneader.

(a-4) Preparation of Compositions for Silicone Rubber Foams

Compositions for silicone rubber foams were obtained by mixing the base compounds obtained in (a-3), the (c) component master batches obtained in (a-1) and the (S) component master batches obtained in. (a-2), and other components shown in Table 1 by a 2-roll mill into uniform compositions.

(b) Manufacture of Silicone Rubber Foams (b-1) Ultraviolet Irradiation Step (Step (1))

The compositions for silicone rubber foams obtained in the above were each subjected to sheeting by a width of 100 mm and a thickness of 5 mm by using a 2-roll mill. The obtained compositions for silicone rubber foams in the sheet shape were irradiated with ultraviolet rays (at a wavelength of 365 nm, 1,000 mJ/cm²) from one side by a high pressure mercury lamp, whereby cross-linked bodies of polyorganosiloxane were obtained.

(b-2) Heating Step (Step (2))

The cross-linked bodies obtained in (b-1) were heat-treated for four hours in an oven at is 200° C. to foam, whereby silicone rubber foams were obtained. Note that in the compositions containing the (F) component, further cross-linking as well as foaming was performed by this treatment,

[Evaluation]

The obtained silicone rubber foams were evaluated by the following method. The results thereof are shown in Table 1 together with the compositions of the compositions for silicone rubber foams.

(Foaming Ratio)

The density of the obtained silicone rubber foam was measured by the water displacement method. The value was calculated as the foaming ratio by dividing the density of the unfoamed silicone rubber similarly measured in advance by the density of the obtained silicone rubber foam.

(Appearance Evaluation)

The foaming state at the surface and the cross-section of the silicone rubber foam was visually evaluated based on the following criteria.

void: occurrence of void was confirmed at the surface.

excellent: the surface was smooth with uniform cells.

(Average Cell Diameter)

The cell diameters of all of the cell cross-sections which were entirely captured in the microscopic image per 1.65 mm² of the cross-section perpendicular to the main surface of the obtained silicone rubber foam were measured in the vertical direction of the image, and the average cell diameter [μm] was calculated.

TABLE 1

| | | | E1 | E2 | E3 | E4 | E5 | E6 | E7 | E8 |
|---|---|---|---|---|---|---|---|---|---|---|
| Composition of | (A) | Base polymer 1 | 100 | 100 | 100 | 100 | 100 | 100 | 100 | 100 |
| | | Base polymer 2 | — | — | — | — | — | — | — | — |

TABLE 1-continued

| Composition (parts by mass) | | | | | | | | | | |
|---|---|---|---|---|---|---|---|---|---|---|
| | (B) | Polymethyl-hydrogensiloxane | 0.90 | 0.45 | 0.22 | 0.11 | 0.06 | 0.03 | 0.01 | 0.11 |
| | (C) | 1,1'-azobis (1-acetoxy-1-phenylethane) | 3.29 | 3.29 | 3.29 | 3.29 | 3.29 | 3.29 | 3.29 | 3.29 |
| | (D) | D4-treated Aerosil 200 | 33.39 | 33.39 | 33.39 | 33.39 | 33.39 | 33.39 | 33.39 | 33.39 |
| | | HMDZ-treated Aerosil 200 | — | — | — | — | — | — | — | — |
| | (E) | (methyl-cyclopentadienyl) trimethylplatinum | 0.0017 | 0.0017 | 0.0017 | 0.0017 | 0.0017 | 0.0017 | 0.0017 | 0.0017 |
| | (F) | 2,5-bis (t-butyl peroxy)-2,5-dimethylhexane | 0.99 | 0.99 | 0.99 | 0.99 | 0.99 | 0.99 | 0.99 | — |
| | | Linear polydimethylsiloxane containing silanol groups at both terminals | 2.86 | 2.86 | 2.86 | 2.86 | 2.86 | 2.86 | 2.86 | 2.86 |
| Si-bonded H in (B) component/Vinyl groups in (A) component (molar ratios) | | | 2.07 | 1.04 | 0.52 | 0.26 | 0.13 | 0.06 | 0.03 | 0.26 |
| Ratio of (C) component to (A) + (B) (ppm in terms of Pt) | | | 8 | 8 | 8 | 8 | 8 | 8 | 8 | 8 |
| Manufacture Evaluation | Ultraviolet irradiation | | PD | PD | PD | PD | PD | PD | PD | PD |
| | Foaming ratio | | 1.19 | 1.35 | 1.80 | 2.40 | 2.95 | 3.71 | 3.83 | 1.49 |
| | Surface state (appearance evaluation) | | ELT | ELT | ELT | ELT | ELT | ELT | ELT | ELT |
| | Average cell diameter (μm) | | — | — | — | 125 | 325 | 415 | 433 | 95 |

| | | | E9 | E10 | E11 | E12 | E13 | E14 | E15 | E16 | E17 |
|---|---|---|---|---|---|---|---|---|---|---|---|
| Composition of Composition (parts by mass) | (A) | Base polymer 1 | 100 | 100 | 100 | 100 | 100 | 100 | 100 | — | — |
| | | Base polymer 2 | — | — | — | — | — | — | — | 100 | 100 |
| | (B) | Polymethyl-hydrogen-siloxane | 0.01 | 0.01 | 0.03 | 0.03 | 0.06 | 0.05 | 0.11 | 0.11 | 0.06 |
| | (C) | 1,1'-azobis (1-acetoxy-1-phenyl-ethane) | 1.61 | 6.37 | 1.61 | 6.37 | 2.20 | 6.37 | 6.37 | 3.36 | 3.36 |
| | (D) | D4-treated Aerosil 200 | 33.97 | 32.32 | 33.97 | 32.32 | 33.77 | 32.32 | 32.32 | — | — |
| | | HMDZ-treated Aerosil 200 | — | — | — | — | — | — | — | 38.39 | 38.39 |
| | (E) | (methyl-cyclopentadienyl) trimethyl-platinum | 0.0017 | 0.0017 | 0.0017 | 0.0017 | 0.0017 | 0.0017 | 0.0017 | 0.0009 | 0.0009 |
| | (F) | 2,5-bis (t-butyl peroxy)-2,5-dimethyl-hexane | 1.00 | 0.96 | 1.00 | 0.96 | 1.00 | 0.96 | 0.96 | 1.01 | 1.01 |
| | | Linear polydi-methylsiloxane containing silanol groups at both terminals | 2.91 | 2.77 | 2.91 | 2.77 | 2.89 | 2.77 | 2.77 | — | — |
| Si-bonded H in (B) component/Vinyl groups in (A) component (molar ratios) | | | 0.03 | 0.03 | 0.07 | 0.06 | 0.13 | 0.13 | 0.25 | 0.50 | 0.25 |
| Ratio of (C) component to (A) + (B) (ppm in terms of Pt) | | | 8 | 8 | 8 | 8 | 8 | 8 | 8 | 4 | 4 |
| Manufacture Evaluation | Ultraviolet irradiation | | PD | PD | PD | PD | PD | PD | PD | PD | PD |
| | Foaming ratio | | 2.40 | 4.26 | 2.35 | 4.42 | 2.45 | 5.23 | 4.42 | 3.48 | 3.71 |
| | Surface state (appearance evaluation) | | ELT | ELT | ELT | ELT | ELT | ELT | ELT | ELT | ELT |
| | Average cell diameter (μm) | | 169 | 476 | 161 | — | 161 | 668 | — | — | — |

E1 to E8 = Example 1 to Example 8; PD = Performed; ELT = Excellent
E9 to E17 = Example 9 to Example 17; PD = Performed; ELT = Excellent Comparative Examples 1 to 8

The compositions for silicone rubber foams with compositions shown in Table 2 were obtained similarly to the examples. Further, the silicone rubber foams were manufactured similarly to the examples except that the ultraviolet irradiation step of (b-1) in the above examples was performed or not performed as shown in Table 2, and then evaluated. The results thereof are shown in Table 2.

TABLE 2

| | | CE1 | CE2 | CE3 | CE4 | CE5 | CE6 | CE7 | CE8 |
|---|---|---|---|---|---|---|---|---|---|
| Composition of Composition (parts by mass) | (A) Base polymer 1 | 100 | 100 | 100 | 100 | 100 | 100 | 100 | — |
| | Base polymer 2 | — | — | — | — | — | — | — | 100 |
| | (B) Polymethylhydrogensiloxane | — | — | 0.11 | — | 0.11 | — | — | — |
| | (C) 1,1'-azobis (1-acetoxy-1-phenylethane) | 3.29 | 3.29 | 3.33 | 3.33 | 3.33 | 1.61 | 6.37 | 3.36 |
| | (D) D4-treated Aerosil 200 | 33.39 | 33.39 | 33.83 | 33.83 | 33.83 | 33.97 | 32.32 | — |
| | HMDZ-treated Aerosil 200 | — | — | — | — | — | — | — | 38.39 |
| | (E) (methylcyclopentadienyl) trimethylplatinum | 0.0017 | 0.0017 | — | — | — | 0.0017 | 0.0017 | 0.0009 |
| | (F) 2,5-bis (t-butyl peroxy)-2,5-dimethylhexane | 0.99 | 0.99 | 1.00 | 1.00 | 1.00 | 1.00 | 0.96 | 1.01 |
| | Linear polydimethylsiloxane containing silanol groups at both terminals | 2.86 | 2.86 | 2.90 | 2.90 | 2.90 | 2.91 | 2.77 | — |
| Si-bonded H in (B) component/Vinyl groups in (A) component (molar ratios) | | — | — | 0.26 | — | 0.26 | — | — | — |
| Ratio of (C) component to (A) + (B) (ppm in terms of Pt) | | 8 | 8 | — | — | — | 8 | 8 | 4 |
| Manufacture | Ultraviolet irradiation | PD | NPD | NPD | PD | PD | PD | PD | PD |
| Evaluation | Foaming ratio | 2.25 | 2.40 | 2.25 | 2.09 | 2.09 | 1.76 | 2.56 | 2.09 |
| | Surface state (appearance evaluation) | Void | Void | Void | Void | Void | ELT | Void | ELT |
| | Average cell diameter (μm) | 314 | 407 | 299 | 254 | 226 | 216 | — | — |

CE1 to CE8 = Comparative Example 1 to Comparative Example 8; PD = Performed; NPD = Not Performed; ELT = Excellent As is seen from Table 1, in the composition for silicone rubber foam of the present invention, the foaming ratio canoe designed in a wide range by changing the ratio of the (B) component to change the cross-linking density of the silicone rubber while keeping constant the ratio of the organic foaming agent being the (C) component to the (A) component.

Further, the wide range of foaming ratio can be similarly designed also by changing the ratio of the (C) component while keeping constant the ratio of the (B) component to the (A) component. In this case, the foaming ratio is higher as the ratio of the (C) component is higher.

On the other hand, in the compositions for silicone rubber foams in the comparative examples 1 to 5, and the comparative example 7, the surface state of the foam is deteriorated because the composition does not contain the (B) component or the (E) component and thus cannot obtain the cross-linked body. The comparative example 6 has the same composition as that of the example 9 except that it does not contain the (B) component, but can obtain only a low foaming ratio as compared to the example 9 because it cannot efficiently take the gas generated from the (C) component into the foam due to insufficient control of the cross-linked state, and its cell state is coarse as compared with the example 9. Similarly, the comparative example 8 has the same composition as those of the examples 16, 17 except that it does not contain the (B) component, but can obtain only a low foaming ratio due to insufficient control of the cross-linked state.

Further, the relations between the average cell diameters [μm] and the foaming ratios of the silicone rubber foams obtained in the above examples and comparative examples are plotted on a graph as FIG. 1. Note that the comparative examples with void are also plotted on the graph. As is seen from FIG. 1, comparing the average cell diameters at similar foaming ratios, the examples controlled in cross-linking during foaming became foams with fine cell diameter as compared with the comparative examples. On the other hand, when comparing regarding the additive amount of the same organic foaming agent (C), the examples controlled in cross-linking during foaming efficiently captured gas generated from the foaming agent and became foams with high foaming ratio as compared with the comparative examples.

It is found that, according to the present invention, a silicone rubber foam, having an excellent foaming state even at a high foaming ratio can be obtained, and a silicone rubber foam with relatively small average cell diameter with respect to the foaming ratio can be obtained.

According to the composition for silicone rubber foam of the present invention, a silicone rubber foam can be provided in which it is possible to arbitrarily control the cross-linked state of the silicone rubber during foaming to thereby control the foaming states such as the cell diameter, the foaming ratio and so on are controlled. According to the manufacturing method of the present invention, it is possible to arbitrarily control the cross-linked state of the silicone rubber during foaming to thereby control the foaming states such as the cell diameter, the foaming ratio and so on of the silicone rubber foam to be obtained. The composition for silicone rubber foam of the present invention is particularly sui table for an extrusion mold and a calendar mold, and the silicone rubber foam to be obtained is preferably used as a gasket, a shock-absorbing material, a heat insulating material and so on.

What is claimed is:

1. A silicone rubber foam obtained by a manufacturing method, comprising:
   a step (1) of irradiating a composition for silicone rubber foam including,
   (A) 100 parts by mass of alkenyl group-containing polyorganosiloxane expressed by a following general formula (A1), having a mass average degree of polymerization of 4,000 to 10,000 and having two or more $R^2$s in the following general formula (A1) as a content per mass in a molecule at a rate of 0.001 mmol/g or more and less than 0.3 mmol/g,

[Chemical Formula 1]

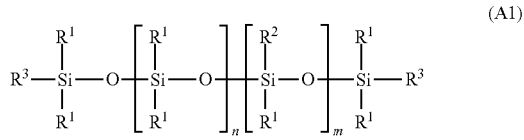

(A1)

where $R^1$ represents an unsubstituted or substituted monovalent hydrocarbon group containing no aliphatic unsaturated group, $R^2$ represents an alkenyl group, $R^3$ represents a monovalent group indicating each independent $R^1$ or $R^2$, n and m represent the total numbers of each recurring unit obtained by random polymerization or block polymerization, and n+m+2 obtained by adding 2 that is the number of terminal groups to n and m represents a mass average degree of polymerization, (B) an amount of polyomanohydrogensiloxane having an average of two or more hydrogen atoms bonded to a silicon atom in a molecule so that a molar ratio of the silicon-atom-bonded hydrogen atoms to the alkenyl groups in the (A) component (the number of moles of hydrogen atoms bonded to the silicon atoms in the (B) component/the number of moles of the alkenyl groups in the (A) component) is 0.001 to 0.26, (C) 0.1 to 10 parts by mass of an organic foaming agent with a decomposition temperature of 50 to 250° C., (D) 5 to 200 parts by mass of silica powder, and (E) a catalyst amount of a platinum-based metal compound catalyst activated with ultraviolet rays, with ultraviolet rays at a temperature lower than the decomposition temperature of the (C) organic foaming agent to obtain a cross-linked body; and a step (2) of heat-treating the cross-linked body at a temperature equal to or higher than the decomposition temperature of the (C) organic foaming agent to obtain silicone rubber foam;

wherein a foaming ratio of the silicone rubber foam is 2.35 times or more.

2. The silicone rubber foam according to claim 1, wherein the foaming ratio is 2.35 to 6 times.

3. The silicone rubber foam according to claim 1, wherein the foam has an average cell diameter from 10 to 700 μm, obtained by measuring all of cell cross-sections existing per 1.65 mm² of a cross-section of the foam using a microscopic image.

4. The silicone rubber foam according to claim 2, wherein the foam has an average cell diameter from 10 to 700 μm, obtained by measuring all of cell cross-sections existing per 1.65 mm² of a cross-section of the foam using a microscopic image.

5. The silicone rubber foam according to claim 1, wherein the composition for silicone rubber foam further comprise (F) 0.001 to 10 parts by mass, per 100 parts by mass of the (A) component, of organic peroxide with a decomposition temperature equal to or higher than the decomposition temperature of the (C) component.

6. The silicone rubber foam according to claim 5, wherein the foaming ratio is 2.35 to 6 times.

7. The silicone rubber foam according to claim 5, wherein the foam has an average cell diameter from 10 to 700 μm, obtained by measuring all of cell cross-sections existing per 1.65 mm² of a cross-section of the foam using a microscopic image.

8. The silicone rubber foam according to claim 6, wherein the foam has an average cell diameter from 10 to 700 μm, obtained by measuring all of cell cross-sections existing per 1.65 mm² of a cross-section of the foam using a microscopic image.

9. The silicone rubber foam according to claim 1, wherein the composition for silicone rubber foam contains 0.1 to 1000 ppm of (methylcyclopentadienyl) trimethylplatinum in terms of platinum metal atoms with respect to the total amount of the (A) component and the (H) component as the (E) platinum-based metal compound catalyst.

10. The silicone rubber foam according to claim 9, wherein the foaming ratio is 2.35 to 6 times.

11. The silicone rubber foam according to claim 9, wherein the foam has an average cell diameter from 10 to 700 μm, obtained by measuring all of cell cross-sections existing per 1.65 mm² of a cross-section of the foam using a microscopic image.

12. The silicone rubber foam according to claim 10, wherein the foam has an average cell diameter from 10 to 700 μm, obtained by measuring all of cell cross-sections existing per 1.65 mm² of a cross-section of the foam using a microscopic image.

* * * * *